United States Patent
Gogineni et al.

(10) Patent No.: US 12,537,012 B2
(45) Date of Patent: Jan. 27, 2026

(54) USER SELECTABLE NOISE SUPPRESSION IN A VOICE COMMUNICATION

(71) Applicant: QUALCOMM Incorporated, San Diego, CA (US)

(72) Inventors: Ravi Teja Gogineni, Hyderabad (IN); Deepak Kumar Challa, San Diego, CA (US); Jeesok Lee, San Diego, CA (US); Durga Prasad Reddy Gajjala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 411 days.

(21) Appl. No.: 18/146,842

(22) Filed: Dec. 27, 2022

(65) Prior Publication Data
US 2024/0212700 A1 Jun. 27, 2024

(51) Int. Cl.
*G10L 21/02* (2013.01)
*G10L 15/08* (2006.01)
*G10L 15/22* (2006.01)
*G10L 21/0208* (2013.01)

(52) U.S. Cl.
CPC .......... *G10L 21/0208* (2013.01); *G10L 15/08* (2013.01); *G10L 15/22* (2013.01); *G10L 2015/225* (2013.01)

(58) Field of Classification Search
CPC . G10L 21/0208; G10L 21/0272; G10L 15/08; G10L 15/02; G10L 15/14; G10L 25/84
See application file for complete search history.

(56) References Cited

U.S. PATENT DOCUMENTS

| | | | | |
|---|---|---|---|---|
| 2001/0041976 | A1* | 11/2001 | Taniguchi | G10L 19/18 704/E19.041 |
| 2017/0372697 | A1* | 12/2017 | Cheatham, III | H04L 65/403 |
| 2018/0109889 | A1* | 4/2018 | Kang | H04R 25/558 |
| 2020/0296521 | A1* | 9/2020 | Wexler | G06F 3/167 |
| 2022/0021985 | A1* | 1/2022 | Wexler | G10L 25/51 |
| 2022/0223165 | A1 | 7/2022 | Kasilya Sudarsan et al. | |
| 2022/0238091 | A1* | 7/2022 | Jasleen | G10K 11/17833 |
| 2022/0247919 | A1* | 8/2022 | O'Leary | H04N 5/2628 |
| 2022/0301573 | A1* | 9/2022 | Wang | G06N 3/044 |
| 2023/0343330 | A1* | 10/2023 | Machanavajhala | G10L 15/26 |
| 2023/0370801 | A1* | 11/2023 | Onishi | H04N 7/152 |
| 2024/0112690 | A1* | 4/2024 | Faubel | G10L 25/30 |

OTHER PUBLICATIONS

International Search Report and Written Opinion—PCT/US2023/080940—ISA/EPO—Mar. 7, 2024.

* cited by examiner

*Primary Examiner* — Mark Villena
(74) *Attorney, Agent, or Firm* — QUALCOMM Incorporated; Espartaco Diaz Hidalgo

(57) ABSTRACT

An apparatus for audio communication includes a memory configured to receive audio data from a user of a voice communication, and one or more processors in communication with the memory. The one or more processors are configured to receive the audio data for the voice communication, which includes voice data of the user and background audio data. The processors are further configured to classify the background audio data into a plurality of types of background audio data, determine to not suppress a subset of the plurality of types of background audio data, process the audio data to not suppress the subset of the plurality of types of background audio data to generate output audio data, and transmit the output audio data.

28 Claims, 11 Drawing Sheets

USER SELECTABLE NOISE SUPPRESSION IN A VOICE COMMUNICATION

TECHNICAL FIELD

This disclosure relates to voice communications, including noise suppression in a voice communication.

BACKGROUND

Noise suppression in voice communications refers to the process of removing background noise from a speech signal in order to improve the clarity and intelligibility of the speech. This is typically accomplished through the use of algorithms that can identify and separate the speech signal from the noise, allowing the speech to be enhanced and the noise to be attenuated or eliminated. Noise suppression can be applied in a variety of different contexts, such as in telephone conversations (including Voice over the Internet Protocol—VoIP communications), gaming communication systems, extended reality (XR) communication systems (which may include one or more of mixed reality—MR—systems, augmented reality—AR—systems, and/or virtual reality—VR—systems), in-car communication systems, and conference call systems.

One approach to noise suppression is to use a noise-canceling algorithm, which works by analyzing the characteristics of the noise and generating an "anti-noise" signal that can cancel out the noise. This may be done by using a microphone to capture the noise signal, and then using a digital signal processing (DSP) algorithm to generate the anti-noise signal. The noise-canceling algorithm can then be used to combine the speech signal and the anti-noise signal, resulting in a signal with reduced noise.

Another approach to noise suppression is to use a noise-reduction algorithm, which works by identifying the noise in the signal and then reducing its intensity. This can be done in a number of different ways, such as by using spectral subtraction or Wiener filtering. These algorithms can be effective at reducing the level of background noise, but they may also introduce some distortion into the speech signal. As such, careful design of the noise-reduction algorithm may be important in order to achieve the desired balance between noise reduction and signal quality.

SUMMARY

The techniques described in this disclosure relate to user-selectable noise suppression in a voice communication. The user-selectable noise suppression techniques of this disclosure allow a user to select which type(s) of background noise or other background audio that are not to be suppressed (e.g., are to be included in a voice communication), rather than having all background audio data automatically suppressed by a noise suppression algorithm. In one example, a voice communication device may include an audio context detector that is configured to classify different types of background audio data (such as audio data other than the user's voice). The voice communication device may further include a noise suppressor that removes all types of background audio data except for those selected by the user. In another example, the noise suppressor may be configured to suppress all types of background audio data by default. In this case, the device may further include a multiplexer that can add back the selected types of background audio data that are not to be suppressed and are to be transmitted along with the user's voice audio data.

One benefit of user-selectable noise suppression in a voice communication is that it can improve the overall quality of the communication. By allowing the user to choose which types of background noise or other audio are included in the communication, the user can ensure that the recipient hears only the desired sounds, which can make the conversation more clear and enjoyable. Additionally, by giving the user control over which background audio is transmitted, these techniques can enable the user to communicate more effectively in noisy environments or to transmit specific sounds or effects along with their voice. Overall, user-selectable noise suppression can enhance the user's experience of voice communications by allowing them to customize the audio to their preferences and needs.

In one example, this disclosure describes an apparatus configured for audio communication, the apparatus comprising a memory configured to receive audio data from a user of a voice communication, and one or more processor in communication with the memory. The one or more processors are configured to receive the audio data for the voice communication, the audio data including voice data of the user and background audio data, classify the background audio data into a plurality of types of background audio data, determine to not suppress a subset of the plurality of types of background audio data, process the audio data to not suppress the subset of the plurality of types of background audio data to generate output audio data, and transmit the output audio data.

In another example, this disclosure describes a method for audio communication, the method comprising receiving audio data for the voice communication, the audio data including voice data of the user and background audio data, classifying the background audio data into a plurality of types of background audio data, determining to not suppress a subset of the plurality of types of background audio data, processing the audio data to not suppress the subset of the plurality of types of background audio data to generate output audio data, and transmitting the output audio data.

In another example, this disclosure describes a non-transitory computer-readable storage medium storing instructions that, when executed, cause one or more processors to receive audio data for the voice communication, the audio data including voice data of the user and background audio data, classify the background audio data into a plurality of types of background audio data, determine to not suppress a subset of the plurality of types of background audio data, process the audio data to not suppress the subset of the plurality of types of background audio data to generate output audio data, and transmit the output audio data.

In another example, this disclosure describes an apparatus configured for audio communication, the apparatus comprising means for receiving audio data for the voice communication, the audio data including voice data of the user and background audio data, means for classifying the background audio data into a plurality of types of background audio data, means for determining to not suppress a subset of the plurality of types of background audio data, means for processing the audio data to not suppress the subset of the plurality of types of background audio data to generate output audio data, and means for transmitting the output audio data.

The details of one or more examples of the disclosure are set forth in the accompanying drawings and the description below. Other features, objects, and advantages will be apparent from the description, drawings, and claims.

DETAILED DESCRIPTION

Figure 1:
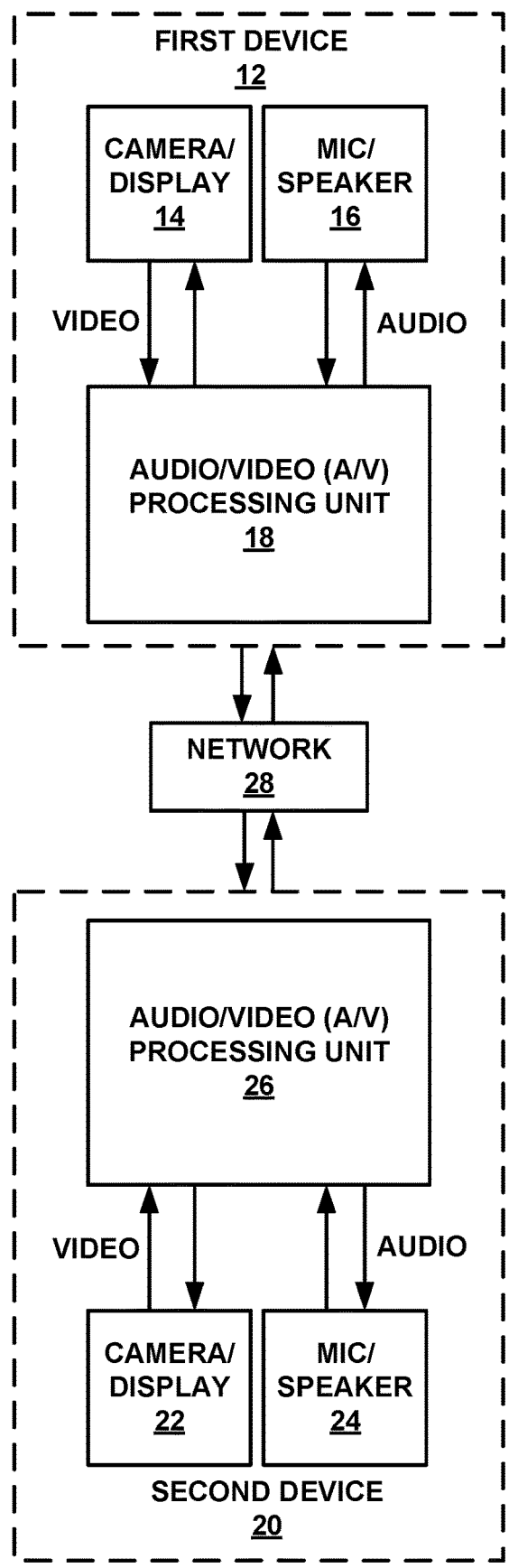
FIG. 1 is a block diagram illustrating an audio communication between a first device and a second device in accordance with the techniques of this disclosure.

This disclosure describes techniques for user-selectable noise suppression in a voice communication. A noise, particularly a loud or unpleasant one, can be disruptive and disturbing. Some example mobile phone and automobile noise suppressors are designed to cancel out noise and preserve speech. Some example noise suppression algorithms use complex mathematical calculations to identify and reduce unwanted noise in a given audio signal. Such algorithms are commonly used in a variety of applications, such as in mobile phones and cars to improve the clarity of speech during calls, or in recording studios to remove background noise from recordings. In general, noise suppression algorithms work by analyzing the frequency spectrum of an audio signal and identifying which components of the signal are likely to be noise (or more simply not the voice of the user). Once the noise has been identified, the algorithm can then apply various techniques to reduce or eliminate such noise, while preserving the speech or other desired components of the signal.

While noise suppression algorithms can be effective in many situations, they have limitations. For example, the above-described noise suppression algorithms may not be able to preserve specific audio contexts that the user may want to transmit, such as particular types of background noise and/or audio (e.g., the sound of a baby crying in the background of a call). Additionally, such noise suppression algorithms do not give the user any control over which noises or background sounds are suppressed and which are preserved, so it is not possible for the user to selectively suppress certain noises while transmitting others. These limitations can be frustrating for users in certain situations, such as when trying to communicate in a noisy environment where the background audio has particular meaning for the recipient of the voice communication or, more generally, when trying to record audio with specific sound effects or background noises.

In accordance with the techniques of this disclosure, an audio communications device receives input from a microphone and may be configured to classify the types of background noise present in the user's surrounding environment during a voice call. This classification information may be provided to a user interface, where the user can select the specific type(s) of background audio data they want to transmit during the voice call. The audio communications device may filter out or suppress other types of background noise to the far end recipient. This allows for a more focused and personalized voice call experience.

In addition to a standard voice call use case, the techniques of this disclosure can also be used in safety and security contexts. For example, if a car crash occurs during a voice call, the voice communications device may be able to detect sounds related to an accident (e.g., crash sounds, glass breaking, etc.). The voice communications device may be configured to automatically allow these sounds to be transmitted to the far end recipient, providing them with potentially important information about the situation. In other examples, voice audio communications device may also be configured to transmit sounds to a cloud computing device for further analysis and detection, such as identifying pets or detecting alarms at home.

Overall, the techniques of this disclosure provide a number of benefits for voice call users. The techniques of this disclosure allow for more personalized and focused voice calls, and can also be used in emergency situations to provide important information to the far end user. The ability to transmit sounds to the cloud for further analysis also opens up new possibilities for home security and pet monitoring.

FIG. 1 is a block diagram illustrating an audio communication (e.g., a voice communication) between a first device and a second device, consistent with techniques of this disclosure. In some examples, the audio communication depicted in FIG. 1 may be a voice call over a wireless network, a voice call over internet protocol (VOIP), a digital radio communication, a satellite audio communication, an audio teleconference, a video conference, or other types of electronic audio communications. The voice call may be conducted over network 28 and data may be transmitted in accordance with a wireless communications standard. In some aspects, the wireless communications standard may be a Long Term Evolution (LTE) standard, an LTE-Advanced (LTE-A) standard, an LTE-A Pro standard, a New Radio (NR) standard, or other wireless communications systems, standards, protocols, and radio technologies not explicitly mentioned herein.

FIG. 1 depicts two devices participating in the audio communication. However, the techniques of this disclosure are applicable for use with any number of devices. In the example of FIG. 1, first device 12 includes a camera and display unit 14, a microphone and speaker unit 16, and an audio and video (A/V) processing unit 18. In some examples a camera may not be present and video processing may be unavailable. Second device 20 includes a camera and display unit 22, a microphone and speaker unit 24, and an audio and video (A/V) processing unit 26. First device 12 communicates with second device 20 via network 28.

In the example of FIG. 1, first device 12 may be configured as a smartphone, smartglasses, smartwatch, tablet computer, automobile infotainment system, laptop computer, desktop computer, Wi-Fi enabled television, video conferencing device, a gaming system, an extended reality (XR) system (which may refer to one or more of a mixed reality—MR—system, an augmented reality—AR—system, and/or a virtual reality—VR—system), or any other device capable of transmitting audio data. Likewise, second device 20 may be configured as a smartphone, tablet computer, automobile infotainment system, laptop computer, desktop computer, Wi-Fi enabled television, video conferencing device, a gaming system, an XR system, or any other device capable of receiving audio and/or video data and receiving user input data. More generally, first device 12 and second device 20 may be any type of communications devices, including mobile communications devices.

Camera and display unit 14 and camera and display unit 22 may each include a camera for capturing still or video images and a display for presenting video data to a user of first device 12 or second device 20. The display may comprise any of a variety of video output devices such as a liquid crystal display (LCD), a plasma display, a light emitting diode (LED) display, an organic light emitting diode (OLED) display, or another type of display device. In these or other examples, the display device may be an emissive display or a transmissive display.

Microphone and speaker unit 16 and microphone and speaker unit 24 may each include one or more microphones for capturing sound and a speaker for presenting sound to a user of first device 12 or second device 20. The speaker may comprise any of a variety of audio output devices such as headphones, a single-speaker system, a multi-speaker system, or a surround sound system.

Audio/video (A/V) processing unit 18 and A/V processing unit 26 may include a number of units responsible for processing audio and/or video data. Each of A/V processing unit 18 and A/V processing unit 26 may be implemented as one or more microprocessors, digital signal processors (DSPs), application specific integrated circuits (ASICs), field programmable gate arrays (FPGAs), discrete logic, hardware, or any combinations thereof, and may be configured to execute software and/or firmware. Each of A/V processing unit 18 and A/V processing unit 26 may include one or more video encoders or video decoders, either of which may be integrated as part of a combined encoder/decoder (CODEC).

Network 28 generally represents any suitable communication medium, or collection of different communication media, for transmitting audio and/or video data from first device 12 to second device 20. Network 28 may comprise any wireless or wired communication medium, such as a radio frequency (RF) spectrum or one or more physical transmission lines, or any combination of wireless and wired media, WiFi, satellite, coax cable, power line, or any combination thereof). In some examples, network 28 may form part of a packet-based network, such as a local area network, a wide-area network, or a global network such as the Internet. Hence, first device 12 and second device 20 may communicate over a communication channel using a communications protocol, such as a standard from the IEEE 802.11 family of standards.

The example of FIG. 1 generally illustrates a two-way audio communication session over network 28. For example, first device 12 may be a local device responsible for capturing audio and/or video using camera and display unit 14 and microphone and speaker unit 16. A/V processing unit 18 may encode or otherwise compress the audio and/or video data. A/V processing unit 18 also packetize the data for transmission over network 28. At second device 20, A/V processing unit 26 may demodulate, de-jitter, decode, A/V sync, and/or post-process received packets. A/V processing unit 26 may then send the processed data to camera and display unit 22 and/or microphone and speaker unit 24 for playback to a user of second device 20.

This disclosure describes techniques related to user-selectable noise suppression in a voice communication, as will be explained in more detail below. The user-selectable noise suppression techniques of this disclosure allow a user to select which type(s) of background noise or other background audio that are not to be suppressed (e.g., are included in a voice communication), rather than having all background audio data automatically suppressed by a noise suppression algorithm. In one example, with reference to first device 12, A/V processing unit 18 may include an audio context detector that is configured to classify different types of background audio data (such as sounds other than the user's voice). A/V processing unit 18 may further include a noise suppressor that removes all types of background audio data except for those selected by the user. In another example, A/V processing unit 18 may include a noise suppressor that is configured to suppress all types of background audio data by default. In this case, A/V processing unit 18 may further include a multiplexer that can add back the selected types of background audio data that are not to be suppressed to be transmitted along with the user's voice audio data.

One benefit of user-selectable noise suppression in a voice communication is that it can improve the overall quality of the communication. By allowing the user to choose which types of background noise or other audio are included in the communication, the user can ensure that the recipient hears only the desired sounds, which can make the conversation more clear and enjoyable. Additionally, by giving the user control over which background audio is transmitted, these techniques can enable the user to communicate more effectively in noisy environments or to transmit specific sounds or effects along with their voice. Overall, user-selectable noise suppression can enhance the user's experience of voice communications by allowing them to customize the audio to their preferences and needs.

In a general example of the disclosure, as will be explained in more detail below, A/V processing unit 18 may be configured to receive audio data for a voice communication, the audio data including voice data of the user and background audio data, classify the background audio data into a plurality of types of background audio data, determine to not suppress a subset of the plurality of types of background audio data, process the audio data to not suppress the subset of the plurality of types of background audio data to generate output audio data, and transmit the output audio data.

The techniques of this disclosure may refer to suppressing audio data. In some examples, suppressing audio data may refer to any techniques for muting, silencing, nulling, lowering the volume (e.g., to zero), and/or removing (e.g., from an audio stream) certain types of audio data captured by a one or more microphones such that the audio data is no longer audible and/or is less audible to other recipients of a voice call. The techniques of this disclosure will be described with reference to first device 12 and A/V processing unit 18. However, it should be understood that second device 20 or any another device participating in an audio communication may apply the techniques of the disclosure for user-selectable noise suppression.

Figure 2:
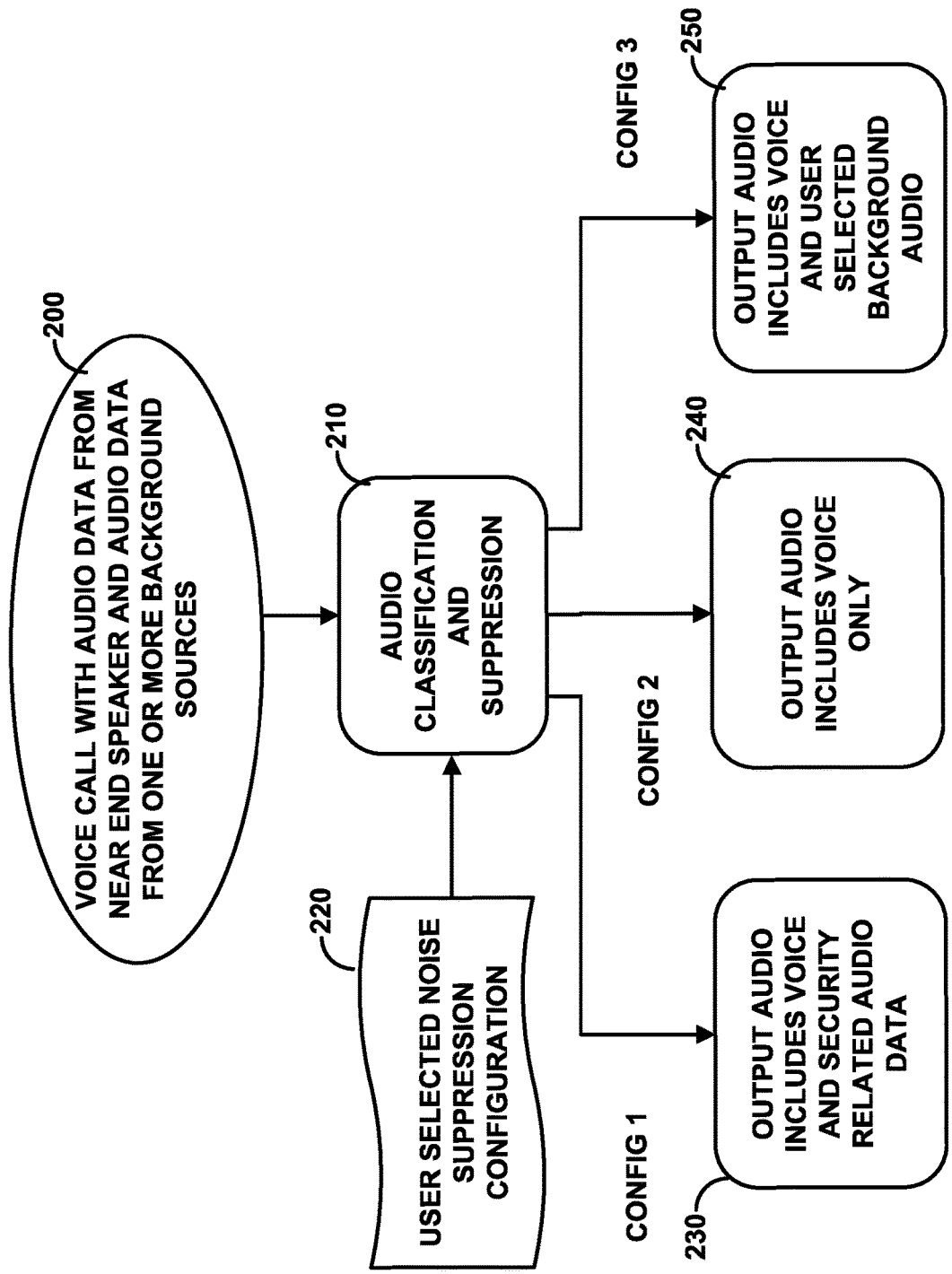
FIG. 2 is a conceptual diagram illustrating techniques for user-selectable noise suppression in a voice communication in accordance with the techniques of this disclosure.

FIG. 2 is a conceptual diagram illustrating techniques for user-selectable noise suppression in a voice communication in accordance with the techniques of this disclosure. FIG. 2 illustrates an audio communication 200 (or any type of voice communication) that comprises a voice call that includes audio data from a near end speaker (e.g., the voice data of a user) and audio data from one or more background sources. In this example, first device 12 of FIG. 1 may be configured to execute audio classification and suppression process 210 that is configured to classify the audio data from the background sources (e.g., background audio data or background noise) into a plurality of different types of background audio data. In addition, audio classification and suppression process 210 may be configured to output audio data according to user selected noise suppression configuration 220.

In general, user selected noise suppression configuration 220 includes information that indicates what types of background noise may be included in the output audio data that gets sent to a far end recipient. As discussed above, some noise suppression algorithms suppress all types of noise and only leave the user's voice in the output data. In one example, the user selected noise suppression configuration 220 may include information that indicates what types of background noise to not suppress. Background noise that is not suppressed is included in the output audio data along with the user's voice. In a reciprocal example, rather than indicating what types of background noise to suppress, the user selected noise suppression configuration 220 may indicate the types of background noise to suppress. In one example, the types of background noise that a user may select whether or not to suppress may be default background noise types. In other examples, audio classification and suppression process 210 may first detect what types of background noise are currently present in the environment and detected, and then may present a list of detected background noise types to the use for selection.

Any number of types background noise, or more generally, background audio data, may be detected and classified by audio classification and suppression process 210. Some example types of background noise may include environmental noise, animal-generated noise, human-generated noise, mechanical noise, electronic noise, and music, among others. Environmental noise, including animal-generated noise, refers to sounds that are produced by the environment, such as the wind, birds, or traffic. Human-generated noise refers to sounds that are produced by other people, such as talking, laughing, babies crying, shouting, and the like. Mechanical noise refers to sounds produced by machines or other mechanical devices, such as air conditioning units, fans, or printers. Electronic noise refers to sounds produced by electronic devices, such as televisions, computers, or cell phones. Music, including background music, refers to sounds produced by instruments or recorded music. In the context of a voice communication, music can be heard in the background if it is playing from a speaker or through headphones, or if music is playing in the background of a voice call environment, such as in a restaurant or store.

In addition to a standard voice call use case, the techniques of this disclosure can also be used in the context of safety related noises to possibly provide an alert for emergency or other security related situations. Safety related noises may include security alarms, car horns, glass breaking, or other sounds indicative of an accident. For example, if a car crash occurs during a voice call, audio classification and suppression process 210 may be able to detect sounds related to an accident (e.g., crash sounds, glass breaking, etc.). Audio classification and suppression process 210, in accordance with user selected noise suppression configuration 220, may be configured to automatically allow these sounds to be transmitted to the far end recipient, providing them with potentially important information about the situation. In other examples, audio classification and suppression process 210 may also be configured to transmit sounds to a cloud computing for further analysis and detection, such as identifying pets or detecting alarms at home.

In some contexts, such as a voice call or video conference, it may be preferable for the user to have certain types of background noises not suppressed, and allowed to accompany the voice data of the user in the final output audio data that is sent to a far end recipient. For example, it may be desirable for baby or pet sounds to not be suppressed so that relatives and friends may hear such sounds in a voice conversation.

FIG. 2 shows three possible configurations (config 1, config 2, and config 3) of output audio data based on user selected noise suppression configuration 220. Of course, other possible configurations may be achieved using the techniques of this disclosure. In config 1, output audio data 230 includes the voice data of the user as well as security related background audio data. In some examples, config 1 may be the default configuration requiring no user input. In other examples, config 1 may result from a user actively selecting a configuration to not suppress security related background audio data.

In config 2, output audio data 240 includes only the voice data of the near end user. That is, audio classification and suppression process 210 may suppress all background audio data. In config 3, output audio data 250 includes the voice data of the user along with any background audio data selected by the user to not be suppressed (e.g., as indicated in user selected noise suppression configuration 220). In some examples, user selected noise suppression configuration 220 may further includes an indication of a noise suppression (NS) aggressiveness. NS aggressiveness may allow the user to input a specific level of noise suppression to apply to a type of background audio that is to be output along with the voice audio data. In some scenarios, a user may wish to allow background audio through, but not at full volume. The NS aggressiveness indication may allow the user to set a specific level of noise suppression (e.g., volume suppression) for background audio that is passed through (e.g., not fully suppressed).

In some examples, user selected noise suppression configuration 220 may be persistent, such that a user need not reselect what types of background noise to let through for every voice communication. In other examples, user selected noise suppression configuration 220 may be reset and updated for each voice communication. Further examples of devices and user interfaces for implementing the techniques of this disclosure are described in more detail below with references to FIGS. 3-10.

Figure 3:
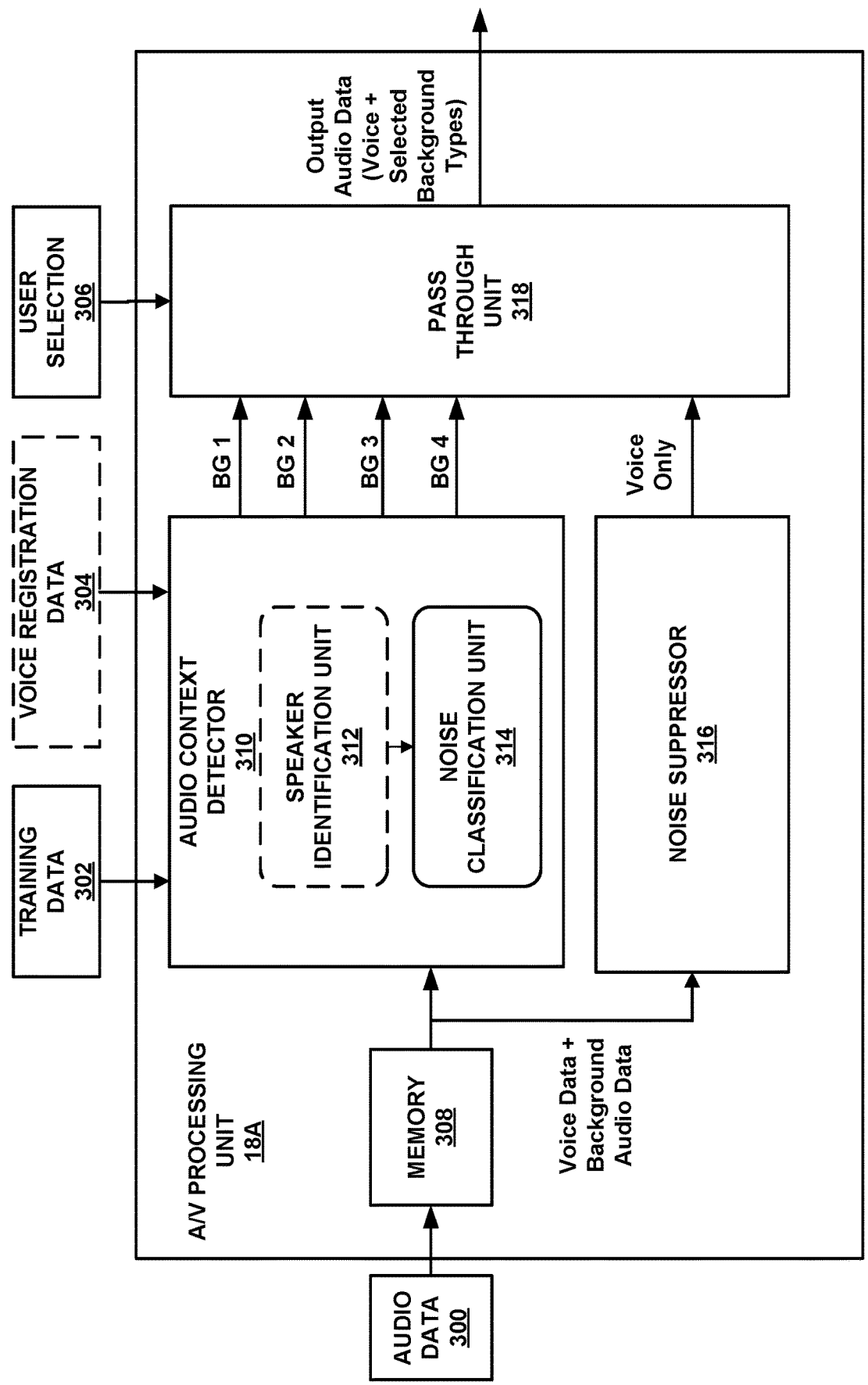
FIG. 3 is a block diagram illustrating a detailed example of a device of FIG. 1 in more detail.

FIG. 3 is a block diagram illustrating a device of FIG. 1 in more detail. In particular, FIG. 3 shows one example implementation of A/V processing unit 18 (labeled A/V processing unit 18A). A/V processing unit 18A may be configured to receive audio data 300 (e.g., from one or more microphones 16 of FIG. 1). Audio data 300 includes voice data of the user as well as background audio data (e.g., any other audio data that is not the voice of the user). A/V processing unit 18A may store the audio data in memory 306.

Audio context detector 310 may be configured to analyze the audio data stored in memory 306. In some examples, audio context detector 310 may be configured to classify the background audio data in audio data 300 into a plurality of types of background audio data. As shown in FIG. 3, the plurality of types of background audio data include background audio data type 1 (BG 1), background audio data type 2 (BG 2), background audio data type 3 (BG 3), and background audio data type 4 (BG 4). The background types may be any of the background audio types discussed above, or other types of background audio types. Of course, audio context detector 310 may be configured to classify audio data 300 into more or fewer types of background audio data.

In one example of the disclosure, audio context detector 310 may be configured to determine the classification of background audio types using one or more artificial intelligence and/or machine learning algorithms. Example artificial intelligence and/or machine learning algorithms may include deep learning systems, neural networks, and other type of predictive analytics systems, including the use of natural language processing. Some example techniques are described below.

Supervised learning: Supervised learning involves training a machine learning model on a labeled dataset, where the correct labels are provided for each piece of audio data. The model can then be used to classify new audio data based on the patterns it learned from the training data.

Unsupervised learning: In this approach, a machine learning model is trained on a dataset without any labels, and the machine learning model learns to identify patterns and structure in the data on its own. This can be useful for finding hidden patterns in audio data and for grouping similar types of noise together.

Semi-supervised learning: Semi-supervised learning is a combination of supervised and unsupervised learning, where the model is trained on a dataset that has both labeled and unlabeled data. The labeled data is used to provide guidance to the model, while the unlabeled data allows it to discover additional patterns and structure in the data.

Transfer learning: Transfer learning involves using a pre-trained machine learning model that has already been trained on a large dataset, and fine-tuning the model to work with a new dataset of audio data. Transfer learning can save time and resources, and can improve the performance of the model on the new data.

Deep learning: Deep learning involves using deep neural networks (DNNs), which are machine learning models with many layers that can learn complex patterns in data. These models can be trained on large datasets of audio data and can achieve state-of-the-art performance on tasks such as noise classification.

Neural networks, including DNNs, have shown great promise as classification tools. A DNN includes an input layer, an output layer, and one or more hidden layers between the input layer and the output layer. Neural networks, including DNNs, may also include one or more other types of layers, such as pooling layers.

Each layer may include a set of artificial neurons, which are frequently referred to simply as "neurons." Each neuron in the input layer receives an input value from an input vector. Outputs of the neurons in the input layer are provided as inputs to a next layer in the neural network. Each neuron of a layer after the input layer may apply a propagation function to the output of one or more neurons of the previous layer to generate an input value to the neuron. The neuron may then apply an activation function to the input to compute an activation value. The neuron may then apply an output function to the activation value to generate an output value for the neuron. An output vector of the neural network includes the output values of the output layer of the neural network.

In examples of this disclosure, the output values of the neural network may include one or more classifications related to types of background noise and/or background audio data. In some examples, a neural network may be configured to first classify audio data as either belonging to the voice of the user or not belonging to the voice of the user (e.g., classifying the audio data as background noise). The neural network may further classify the background noise into different types. The neural network may be trained using one or more training datasets. In one example, the training dataset may include a set of labeled audio data representing a plurality of types of background noises. In other examples, the training dataset may further include a registered version of a user's voice so that the neural network may more easily distinguish the user's voice from background noise.

For each respective training dataset, a training input vector of the respective training dataset comprises a value for each element of the plurality of input elements. For each respective training dataset, the target output vector of the respective training dataset comprises a value for each element of the plurality of output elements.

In the example of this disclosure, audio context detector 310 may obtain a current input vector that corresponds to audio data (e.g., audio data 300) received from a participant's microphone(s) (e.g., microphone 16 of FIG. 1). Audio context detector 310 may apply a DNN to the current input vector to generate a current output vector. Audio context detector 310 may then determine, based on the current output vector, a speaker classification and/or a type of background audio data classification. As will be explained below, A/V processing unit 18A may then suppress or not suppress certain types of classified background audio data based on user input.

In the example of FIG. 3, audio context detector 310 includes a noise classification unit 314, and optionally includes a speaker identification unit 312. Speaker identification unit 312 may be configured to identify the voice of the user so as to distinguish voice data in audio data 300 from background audio data. Noise classification unit 314 may be configured to perform the noise classification described above to identify a plurality of a types of background audio data in audio data 300. FIG. 3 shows speaker identification unit 312 and noise classification unit 314 as separate units executing separate neural networks. In other examples, speaker identification unit 312 and noise classification unit 314 may be combined in a single neural network having multiple outputs.

Audio context detector 310 may be configured to execute a trained a neural network executed in speaker identification unit 312. Speaker identification unit 312 may be trained the optional voice registration data 304. Voice registration data 304 may be a sample of audio data of the voice of a particular participant of the voice communication and/or a user of first device 12. Speaker identification unit 312 may be configured to analyze audio data 300 to determine whether the audio data is representative of the user. For example, speaker identification unit 312 may classify audio data 300 relative to voice registration data 304 to determine a speaker classification. In one example, the speaker classification may indicate whether or not audio data is representative of the participant's voice or is background audio data.

Audio context detector 310 may further execute a trained a neural network executed in noise classification unit 314. Noise classification unit 314 may be trained using training data 302. Training data 302 may be labeled audio data representing a plurality of types of background noises. Noise classification unit 314 may be configured to analyze audio data 300 to classify the audio data into different types of audio data, as well as to output separate streams of background audio data for further processing. For example, for each of the types of background audio data detected and classified (e.g., BG1-BG4), audio context detector may output a separate stream of background audio data. In some examples, noise classification unit 314 may use the output of speaker identification unit 312 to distinguish voice data from background audio data when making the classifications.

As shown in FIG. 3, A/V processing unit 18A also includes a noise suppressor 316. In the example of FIG. 3, noise suppressor 316 is configured to suppress all background noise and background audio data from audio data 300 and output only voice audio data. Noise suppression is a technique used to reduce unwanted background noise from an audio signal. There are many different methods for noise suppression, but some common examples include filtering, signal cancellation, machine learning techniques, and spectral subtraction, among other.

In one example, noise suppressor 316 may use filtering to remove specific frequencies from the audio signal that are known to correspond to noise, while leaving the rest of the signal untouched. Examples of filtering may include adaptive filtering and Wiener filtering. In adaptive filtering, the filter used to remove the noise is continuously adjusted based on the changing characteristics of the noise. This can be more effective at removing non-stationary noise, such as noise that changes over time. Wiener filtering uses a mathematical model of the signal and noise to estimate the optimal filter parameters for removing the noise. Wiener filtering can be a more complex approach, but it can also provide better results in some cases.

In another example, noise suppressor 316 uses signal cancellation. Signal cancellation involves creating a replica of the noise signal and then subtracting it from the original signal, effectively canceling out the noise.

In another example, noise suppressors 316 may use a machine learning noise suppression technique. In this approach, a machine learning algorithm is trained on a dataset of noisy and clean audio signals. The algorithm learns to identify the characteristics of the noise and can then automatically remove it from new signals.

Figure 4:
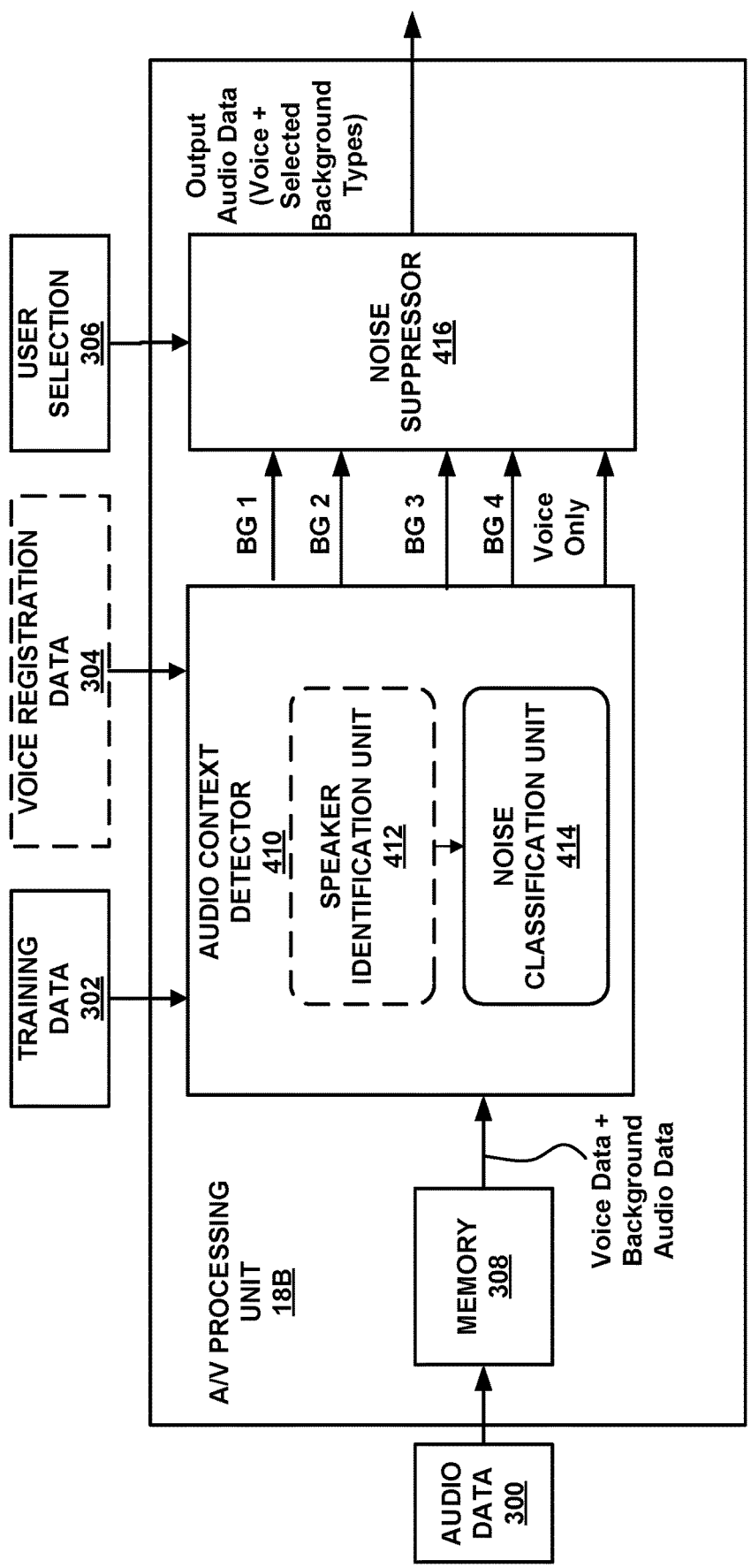
FIG. 4 is a block diagram illustrating another detailed example of a device of FIG. 1 in more detail.

As can be seen in the example FIG. 3, A/V processing unit 18A processes audio data 300 in two streams. Noise suppressor 316 operates on a first stream of audio data 300, while audio context detector 310 operates on a second, separate stream of audio data 300. Both streams of audio data 300 include both voice data and background audio data. FIG. 3 is only one possible example, different configurations of A/V processing unit 18 are shown in FIGS. 3-4.

In the example, of FIG. 3 noise suppressor 316 outputs voice only audio data to pass through unit 318. Audio context detector 310 not only classifies the types of background audio data, but also passes through audio streams of each type of background noise to pass through unit 318. In this way, only particular types of background noise selected by the user may be added back to the voice data by pass through unit 318 to eventually be included in the output audio data.

Pass through unit 318 receives the voice only audio data from noise suppressor and the streams of classified background audio data (BG1-BG2) from audio context detector 310. Pass through unit 318 may also be configured to access user selection 306. User selection 306 is analogous to user selected noise suppression configuration 220 of FIG. 2. In one example, user selection 306 may include indications of particular types of background audio to not suppress. Put another way, user selection 306 may indicate a subset of the plurality types of background audio data that is not to be suppressed. In some examples, user selection 306 may indicate that no background audio data is to be suppressed. In a reciprocal example, user selection 306 may include indications of which types of background audio data that A/V processing unit 18A is to suppress.

Based on user selection 306, pass through unit 318 may combine the voice only data with one or more of the streams of background audio data to generate output audio data. In a general example, pass through unit 318 may be configured as a multiplexer. The output audio data includes the voice data as well as the types of background audio data indicated by user selection 306 to not suppress.

In summary, in a general example of the disclosure, first device 12 may be configured to receive audio data 400 for a voice communication, audio data 400 including voice data of the user and background audio data. First device 12 may be further configured to classify the background audio data into a plurality of types of background audio data. For example, first device 12 may use audio context detector 310 to classify the background audio data. First device 12, e.g., via pass through unit 318, may determine to not suppress a subset of the plurality of types of background audio data. In one example, pass through unit 318 may receive an input from a user (e.g., user selection 306) indicating the subset of the plurality of types of background audio data.

First device 12 may then process the audio data to not suppress the subset of the plurality of types of background audio data to generate output audio data, and may transmit the output audio data. In the example of FIG. 3, first device 12 may be configured to perform, on a first stream of the audio data, a noise suppression process (e.g., noise suppressor 316) to suppress the background audio data to generate voice only audio data. First device 12 may also extract, on a second stream of the audio data, the subset of the plurality of types of background audio data. In one example, audio context detector 310 may be configured to extract the subset of the plurality of types of background audio data. First device 12 may then combine (e.g., using pass through unit 318) the voice only audio data with the subset of the plurality of types of background audio data to generate the output audio data.

One benefit of user-selectable noise suppression in a voice communication is that it can improve the overall quality of the communication. By allowing the user to choose which types of background noise or other audio are included in the communication, the user can ensure that the recipient hears only the desired sounds, which can make the conversation more clear and enjoyable. Additionally, by giving the user control over which background audio is transmitted, these techniques can enable the user to communicate more effectively in noisy environments or to transmit specific sounds or effects along with their voice. Overall, user-selectable noise suppression can enhance the user's experience of voice communications by allowing them to customize the audio to their preferences and needs.

FIG. 4 is a block diagram illustrating another detailed example of a device of FIG. 1 in more detail. FIG. 4 shows another example of A/V processing unit 18 of FIG. 1 (labeled A/V processing unit 18B). A/V processing unit 18B is similar to that of A/V processing unit 18A, but lacks a pass through unit. In addition, the functionality of the audio context detector and noise suppressor is slightly changed.

Audio context detector 410 operates in the same manner as audio context detector 310. However, rather than outputting just separate streams of classified background data, audio context detector 410 also outputs a stream of voice only audio data. The streams of classified background audio data and the stream of voice only audio data are sent to noise suppressor 416.

Noise suppressor 416 combines the functionality of noise suppressor 316 and pass through unit 318 of FIG. 3. Noise suppressor receives the voice and background audio streams as well as user selection 306. Noise suppressor 416 is configured to selectively suppress only the background audio data types indicated by user selection 306. That is, rather than suppressing all background noise like noise suppressor 316, noise suppressor 416 is configured to selectively suppress certain types of noise. Accordingly, in the example of FIG. 4, first device 12 is configured to perform a noise suppression process on the audio data to suppress types of background audio data not in the subset of the plurality of types of background audio data (e.g., those types indicated to not be suppressed by user selection 360) to generate the output audio data.

Figure 5:
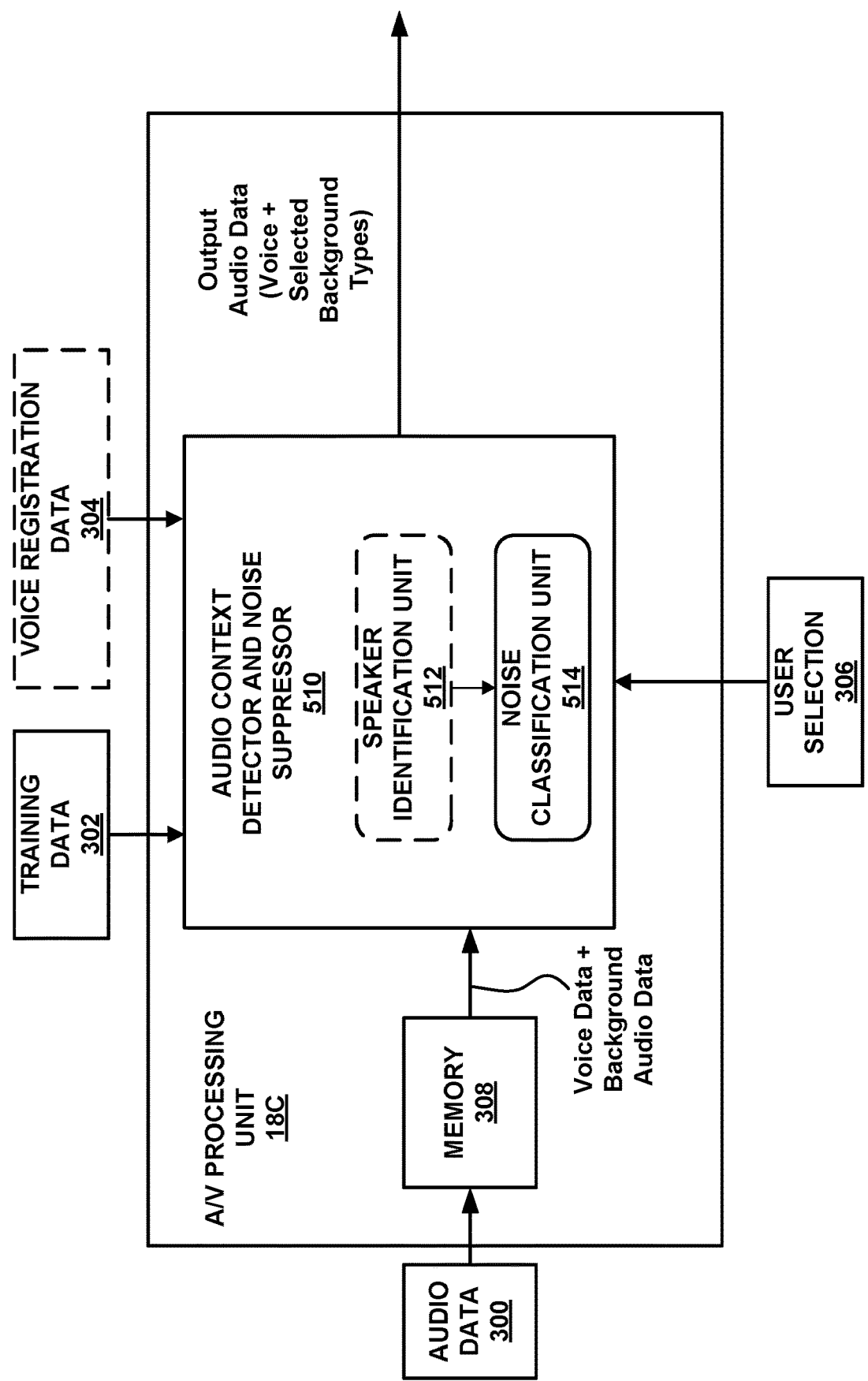
FIG. 5 is a block diagram illustrating another detailed example of a device of FIG. 1 in more detail.

FIG. 5 is a block diagram illustrating another detailed example of a device of FIG. 1 in more detail. FIG. 5 shows another example of A/V processing unit 18 of FIG. 1 (labeled A/V processing unit 18C). A/V processing unit 18C is similar to that of A/V processing unit 18A, but lacks both a pass through unit and the noise suppressor. In FIG. 5, the functionality of the pass through unit and the noise suppressor and combined into a single audio context detector and noise suppressor unit 510.

Audio context detector and noise suppressor unit 510 operates in the same manner as audio context detector 310. However, rather than outputting just separate streams of classified background data, audio context detector and noise suppressor unit 510 also receive user selection and directly generates the output audio data that includes the voice data and the subset of the plurality of types of background audio data (e.g., those types indicated to not be suppressed by user selection 360).

Figure 6:
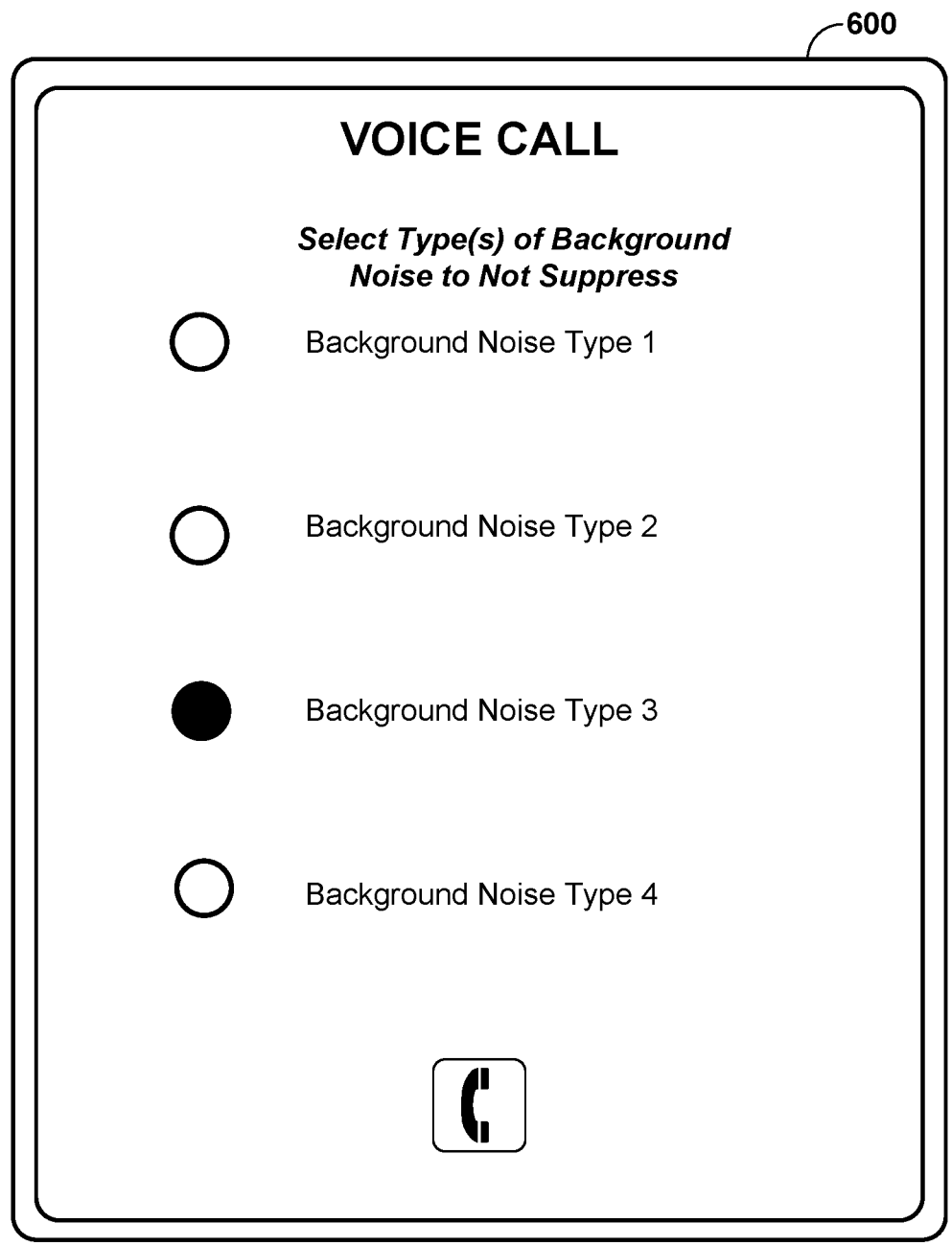
FIG. 6 is an example graphical user interface according to one example of the disclosure.

FIGS. 6-10 show example graphical user interfaces wherein a user may make a selection of what types of background noise to suppress or not suppress. FIG. 6 is an example graphical user interface according to one example of the disclosure. FIG. 6 shows a graphical user interface 600 that displays a plurality of selections of types of background noise that a user may indicate are not to be suppressed. Graphical user interface 600 shows a general example with four different background noise types (Background Noise Type 1, Background Noise Type 2, Background Noise Type 3, and Background Noise Type 4). In the example of FIG. 6, a user has selected Background Noise Type 3 to not be suppressed. As such, first device 12 would be configured to output voice data and background audio data of type 3 using any of the techniques described above.

Accordingly, in a general example, first device 12 may be configured to generate a graphical user interface on the display, wherein the graphical user interface provides a plurality of selections corresponding to the plurality of types of background audio data, receive one or more indications, via the graphical user interface, which identifies the subset of the plurality of background audio data to not suppress, and determine to not suppress a subset of the plurality of types of background audio data based on the one more indications.

FIG. 6 shows an example where the user selects which types of background noise to not suppress. This example may be particularly useful in contexts where first device 12 includes a noise suppressor that typically suppresses all types of background noise. By only requiring the selection of types of noise not to suppress, fewer user selections are typically made.

Figure 7:
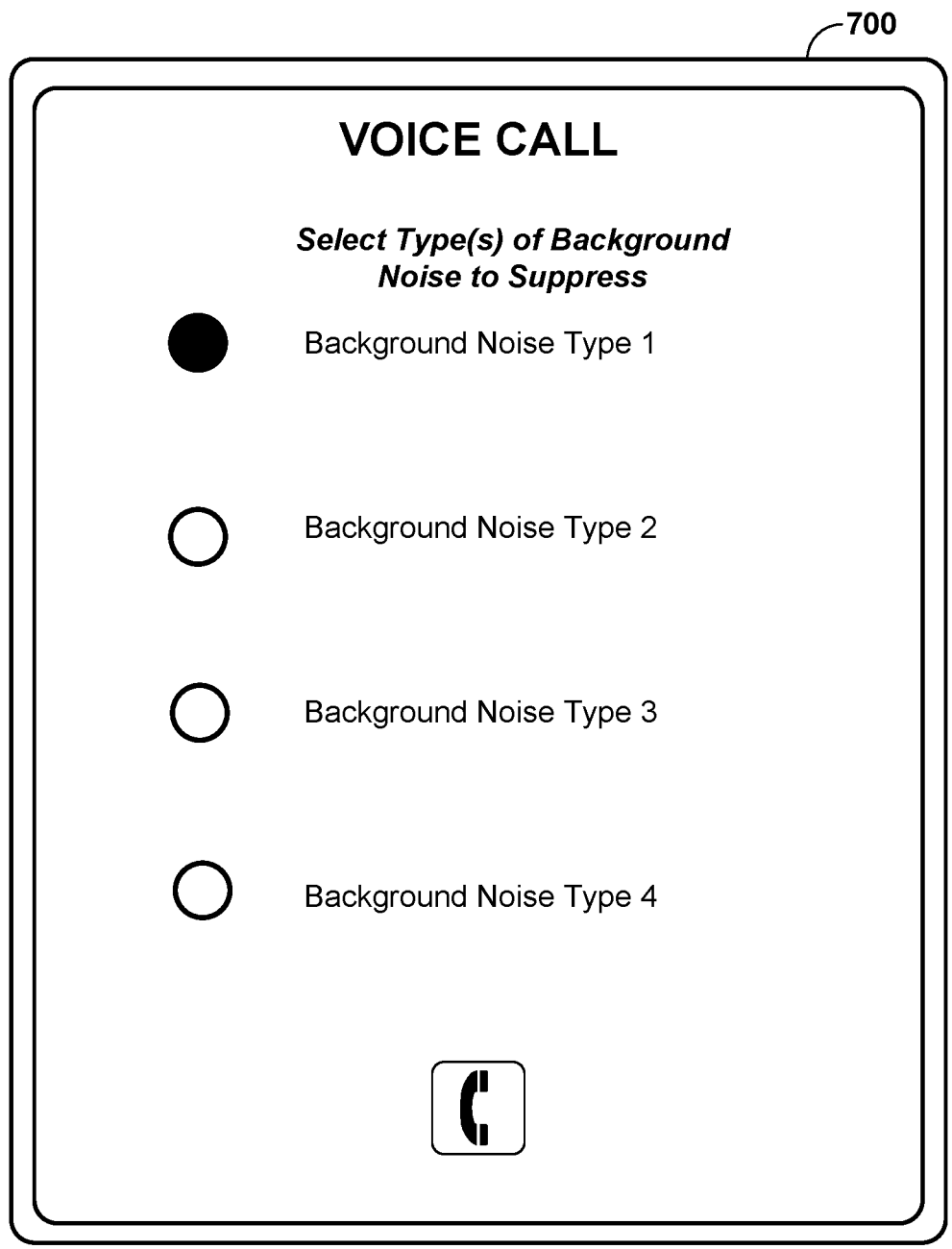
FIG. 7 is an example graphical user interface according to another example of the disclosure.

However, it should be understood that the techniques of this disclosure may work equally well in the context of positively selecting types of background noise that should be suppressed. This scenario may work well in use cases where first device 12 may typically not suppress any noise. FIG. 7 shows the reciprocal example of a graphical user interface 700 that displays a plurality of selections of types of background noise that a user may indicate are to be suppressed. Graphical user interface 700 shows a general example with four different background noise types (Background Noise Type 1, Background Noise Type 2, Background Noise Type 3, and Background Noise Type 4). In the example of FIG. 7, a user has selected Background Noise Type 1 to be suppressed. As such, first device 12 would be configured to output voice data and all other background noise, except background audio data related to background noise type 1.

Figure 8:
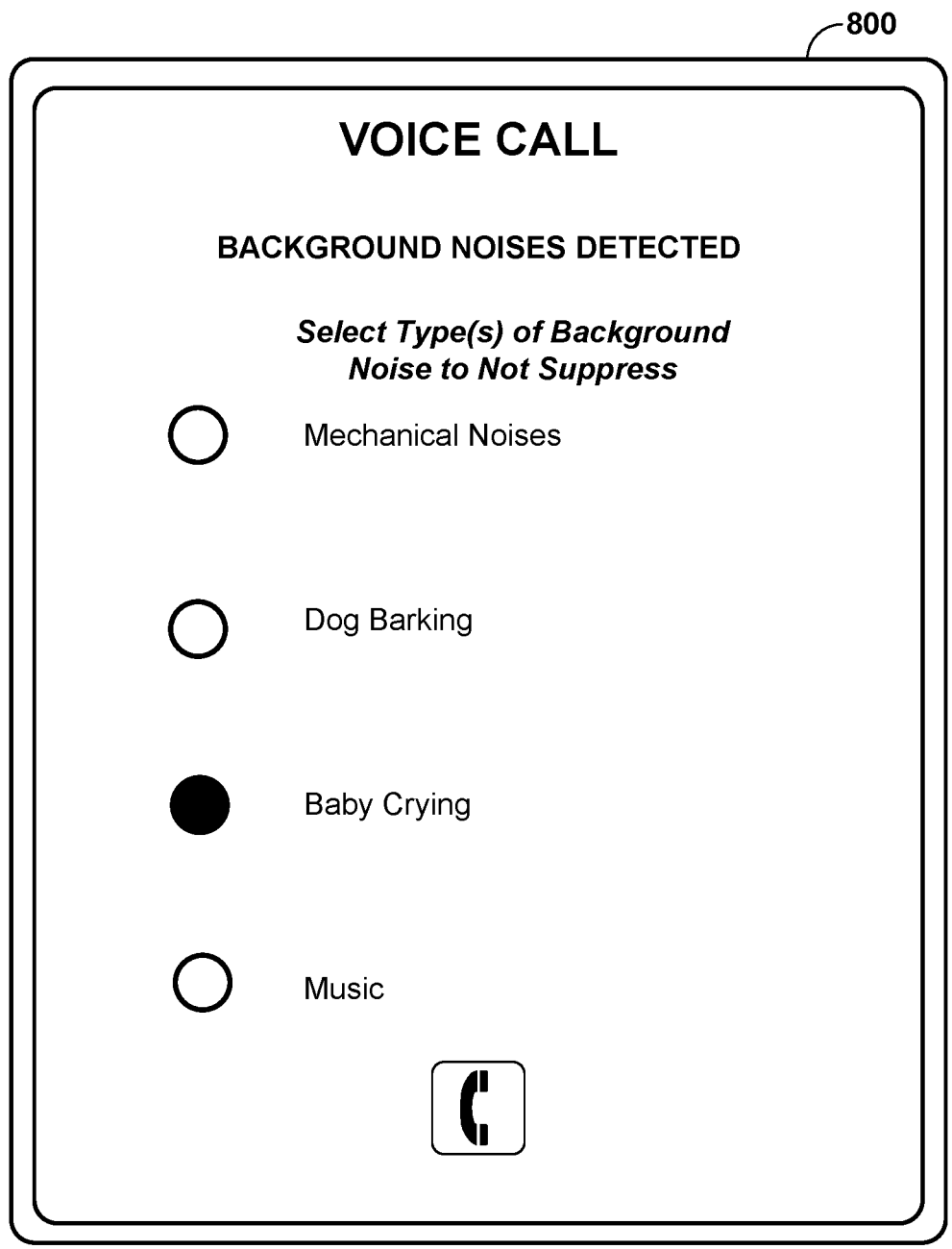
FIG. 8 is an example graphical user interface according to another example of the disclosure.

In the examples of FIG. 6 and FIG. 7, the types of background noise displayed on the corresponding graphical user interfaces may be fixed. That is, the same types of background noises are displayed for selection for each voice communication. In other examples, rather than displaying a fixed list of background noise types, first device 12 may be configured to first detect and classify background noise types that are actually currently being detect and then display those currently detected background noise types to the user for selection. FIG. 8 shows an example of a graphical user interface 800 that shows background noise types that are currently detected ("Background Noises Detected"). In this example, first device 12 has detected and classified the background audio data as including mechanical noises, a dog barking, a baby crying, and music. The user has selected the baby crying noise type to not be suppressed. As such, first device 12 would output both voice audio data and audio data corresponding to the baby's cry.

Accordingly, in another example of the disclosure, first device 12 may be configured to adaptively detect the plurality of types of background audio data, and adaptively update the plurality of selections based on the plurality of types of background audio data based detected.

Figure 9:
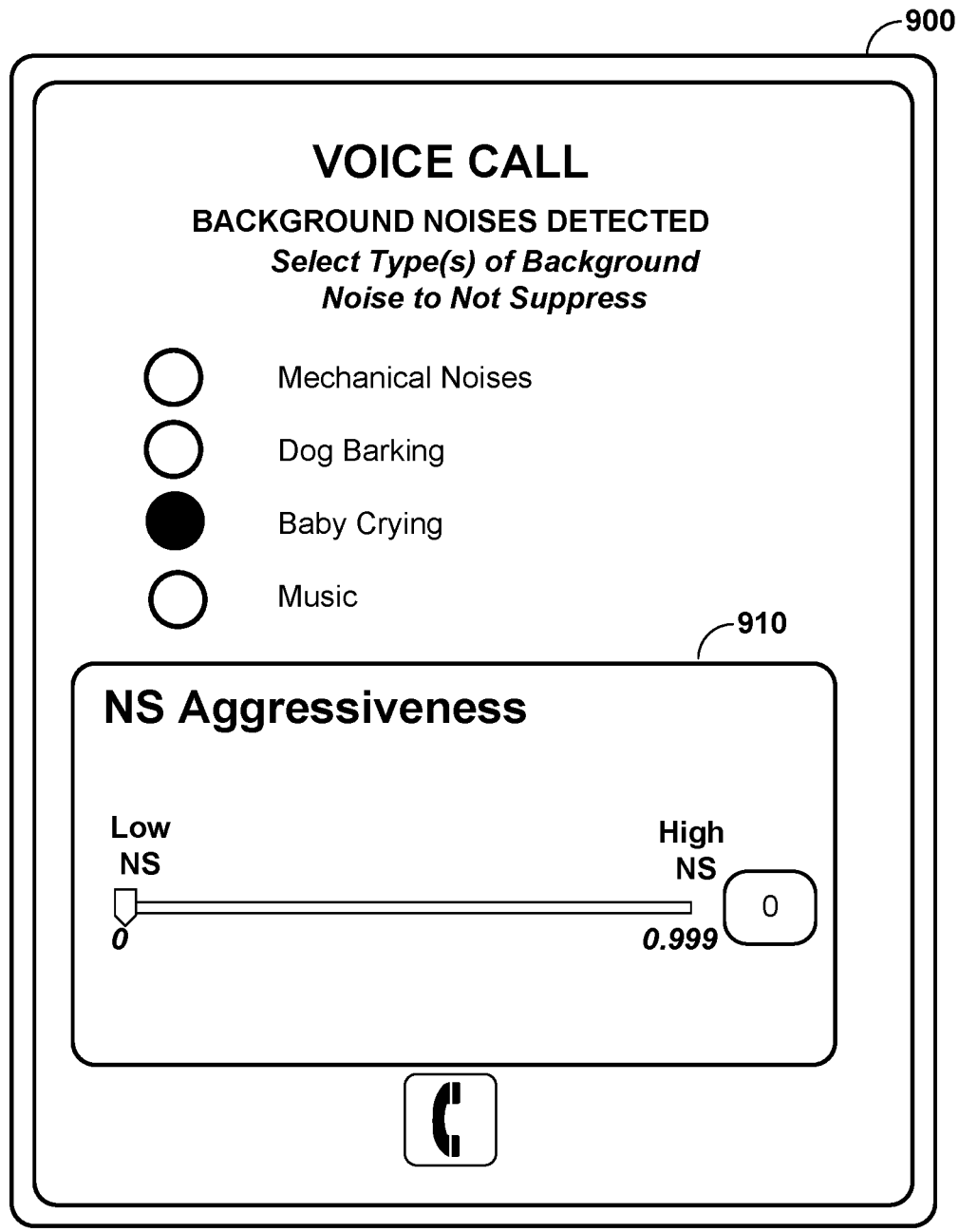
FIG. 9 is an example graphical user interface according to another example of the disclosure.

FIG. 9 shows an example graphical user interface according to another example of the disclosure. In the example of FIG. 9, in addition to selecting particular background audio type to not suppress, graphical user interface 900 may also include noise suppression (NS) aggressiveness controller 910. NS aggressiveness controller 910 may allow the user to input a specific level of noise suppression to apply to a type of background audio that is to be output along with the voice audio data. In some scenarios, a user may wish to allow background audio through, but not at full volume. The NS aggressiveness controller 910 may allow the user to set a specific level of noise suppression (e.g., volume suppression) for background audio that is passed through (e.g., not fully suppressed). In FIG. 9, the NS aggressiveness controller 910 is a slider bar allowing noise suppression levels from 0 (e.g., no suppression) to 0.999 (e.g., 99.9% suppressed), but other forms of input may also be used.

Figure 10:
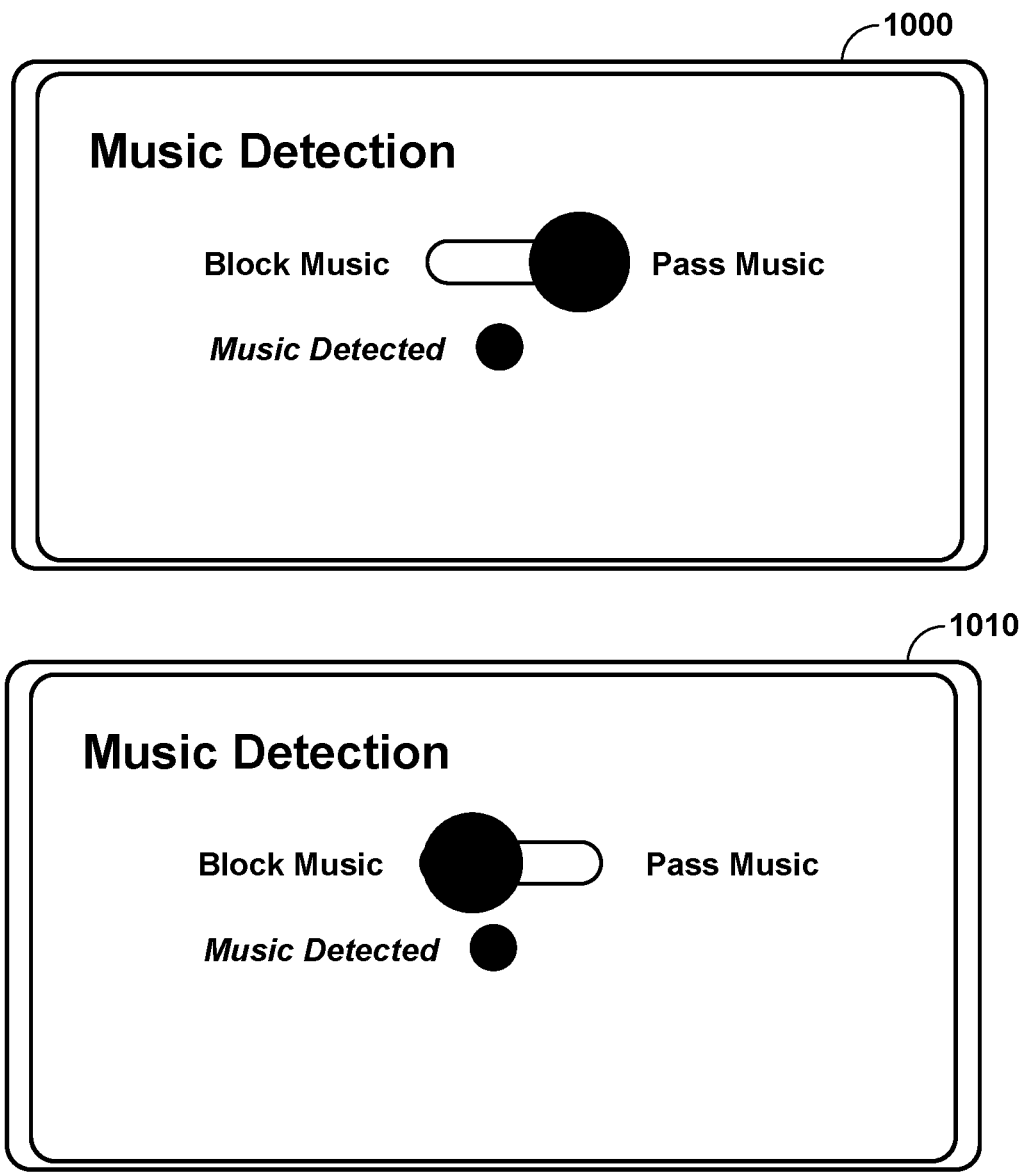
FIG. 10 is an example graphical user interface according to another example of the disclosure.

FIG. 10 is an example graphical user interface according to another example of the disclosure. FIG. 10 shows an example graphical user interface 1000 that specifically allows a user to control how music detected in the background of a voice communication to be processed. Music is a typical source of background audio data and may often be the type of background audio data that a user may wish to not suppress. In graphical user interface 1000, a music detected icon is activated indicating that music is detected in the background of a voice communication. Graphical user interface 1000 includes a slider button that is moved to the "pass music" setting. In this setting, first device 12 may be configured to not suppress background audio data identified as music. In graphical user interface 1010, the user has moved the slider button to the "block music" setting. In this setting, first device 12 may be configured to suppress background audio data identified as music.

Figure 11:
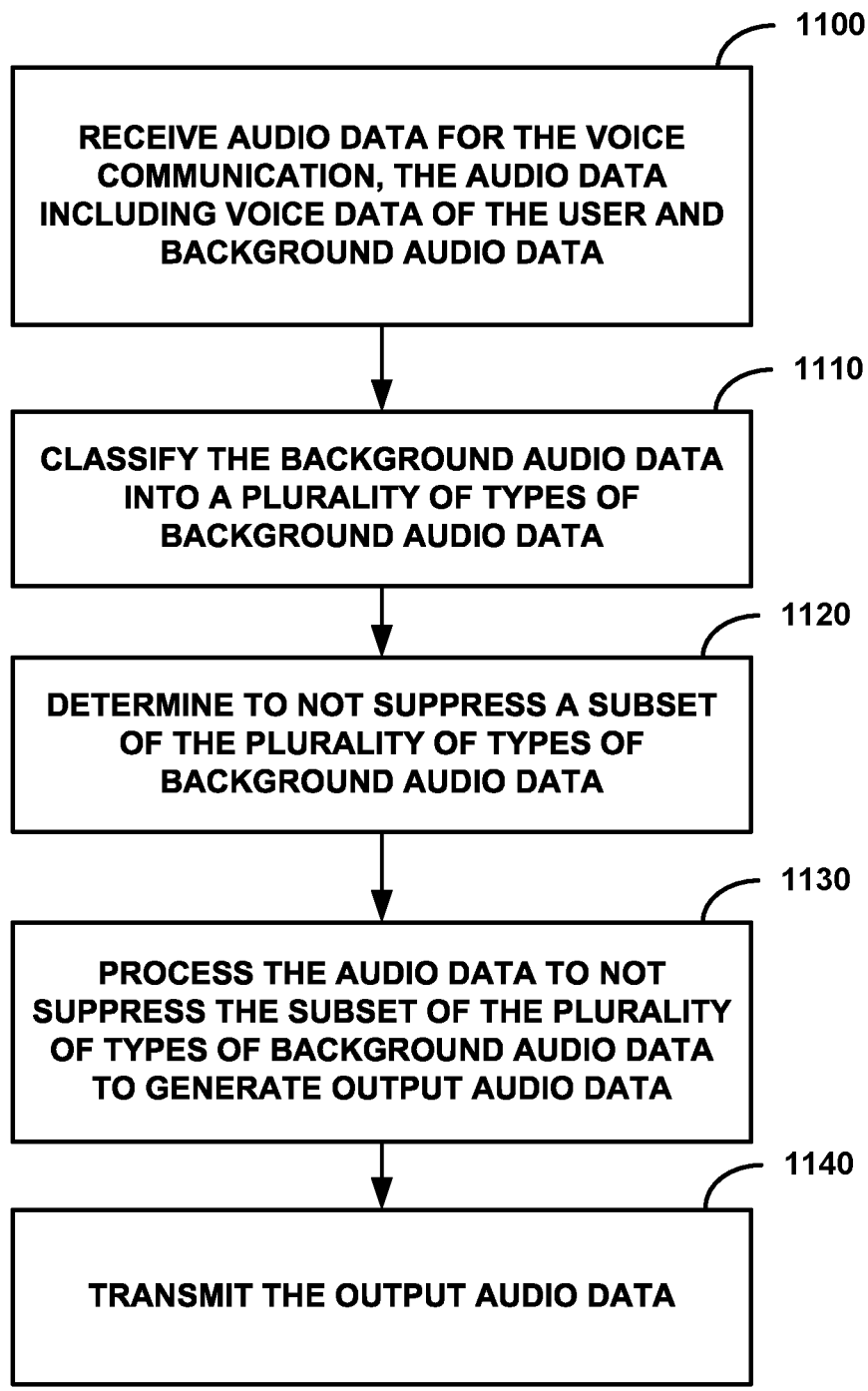
FIG. 11 is a flowchart illustrating an example technique for user-selectable noise suppression in a voice communication in accordance with the techniques of this disclosure.

FIG. 11 is a flowchart illustrating an example technique for user-selectable noise suppression in a voice communication in accordance with the techniques of this disclosure. The techniques of FIG. 11 may be performed by one or more structural components of device 12, including A/V processing unit 18. In some examples, the techniques of FIG. 11 may be performed by a remote device (e.g., a cloud server) located separately from the device having the microphone.

In one example of the disclosure, A/V processing unit 18 may be configured to receive audio data for the voice communication, the audio data including voice data of the user and background audio data (1100). A/V processing unit 18 may be further configured to classify the background audio data into a plurality of types of background audio data (1110).

In one example, to classify the background audio data into the plurality of types of background audio data, A/V processing unit 18 is configured to process the audio data using an artificial intelligence process to identify the plurality of types of background audio data. In one example, the artificial intelligence process is one or more of a neural network, an artificial neural network, a deep neural network, a predictive analytics system, supervised learning, unsupervised learning, semi-supervised learning, or transfer learning.

A/V processing unit 18 may be further configured to determine to not suppress a subset of the plurality of types of background audio data (1120). In one example, to determine to not suppress the subset of the plurality of types of background audio data, A/V processing unit 18 is configured to receive an input from the user indicating the subset of the plurality of types of background audio data. In some examples, A/V processing unit 18 is configured to generate a graphical user interface on a display, wherein the graphical user interface provides a plurality of selections corresponding to the plurality of types of background audio data, receive one or more indications, via the graphical user interface, which identifies the subset of the plurality of background audio data to not suppress, and determine to not suppress a subset of the plurality of types of background audio data based on the one more indications. In some examples, A/V processing unit 18 may be further configured to adaptively detect the plurality of types of background audio data, and adaptively update the plurality of selections based on the plurality of types of background audio data based detected.

A/V processing unit 18 may be further configured to process the audio data to not suppress the subset of the plurality of types of background audio data to generate output audio data (1130), and transmit the output audio data (1140). In one example, to process the audio data to not suppress the subset of the plurality of types of background audio data to generate output audio data, A/V processing unit 18 may be further configured to perform, on a first stream of the audio data, a noise suppression process to suppress the background audio data to generate voice only audio data, extract, on a second stream of the audio data, the subset of the plurality of types of background audio data, and combine the voice only audio data with the subset of the plurality of types of background audio data to generate the output audio data.

In another example, to process the audio data to not suppress the subset of the plurality of types of background audio data to generate output audio data, A/V processing unit 18 may be further configured to perform a noise suppression process on the audio data to suppress types of background audio data not in the subset of the plurality of types of background audio data to generate the output audio data.

Other aspects of the devices, methods, and techniques of this disclosure are described below.

Aspect 1—An apparatus configured for audio communication, the apparatus comprising: a memory configured to receive audio data from a user of a voice communication; and one or more processors in communication with the memory, the one or more processors configured to: receive the audio data for the voice communication, the audio data including voice data of the user and background audio data; classify the background audio data into a plurality of types of background audio data; determine to not suppress a subset of the plurality of types of background audio data; process the audio data to not suppress the subset of the plurality of types of background audio data to generate output audio data; and transmit the output audio data.

Aspect 2—The apparatus of Aspect 1, wherein to determine to not suppress the subset of the plurality of types of background audio data, the one or more processors are further configured to: receive an input from the user indicating the subset of the plurality of types of background audio data.

Aspect 3—The apparatus of Aspect 2, further comprising a display, wherein the one or more processors are further configured to: generate a graphical user interface on the display, wherein the graphical user interface provides a plurality of selections corresponding to the plurality of types of background audio data; receive one or more indications, via the graphical user interface, which identifies the subset of the plurality of background audio data to not suppress; and determine to not suppress a subset of the plurality of types of background audio data based on the one more indications.

Aspect 4—The apparatus of Aspect 3, wherein to generate the graphical user interface, the one or more processors are configured to: adaptively detect the plurality of types of background audio data; and adaptively update the plurality of selections based on the plurality of types of background audio data based detected.

Aspect 5—The apparatus of any of Aspects 1-4, wherein the subset of the plurality of types of background audio data include background audio data related to security.

Aspect 6—The apparatus of any of Aspects 1-5, wherein to classify the background audio data into the plurality of types of background audio data, the one or more processors are configured to: process the audio data using an artificial intelligence process to identify the plurality of types of background audio data.

Aspect 7—The apparatus of Aspect 6, wherein the artificial intelligence process is one or more of a neural network, an artificial neural network, a deep neural network, a predictive analytics system, supervised learning, unsupervised learning, semi-supervised learning, or transfer learning.

Aspect 8—The apparatus of any of Aspects 1-7, wherein to process the audio data to not suppress the subset of the plurality of types of background audio data to generate output audio data, the one or more processors are configured to: perform, on a first stream of the audio data, a noise suppression process to suppress the background audio data to generate voice only audio data; extract, on a second stream of the audio data, the subset of the plurality of types of background audio data; and combine the voice only audio data with the subset of the plurality of types of background audio data to generate the output audio data.

Aspect 9—The apparatus of Aspects 1-7, wherein to process the audio data to not suppress the subset of the plurality of types of background audio data to generate output audio data, the one or more processors are configured to: perform a noise suppression process on the audio data to suppress types of background audio data not in the subset of the plurality of types of background audio data to generate the output audio data.

Aspect 10—The apparatus of Aspects 1-9, wherein the plurality of types of background audio data may include one or more of environmental noise, human-generated noise, animal-generated noise, mechanical noise, or electronic noise.

Aspect 11—The apparatus of Aspects 1-10, wherein the apparatus is a mobile communications device.

Aspect 12—The apparatus of any of Aspect 1-11, wherein to transmit the output audio data, the one or more processors are configured to: transmit the output audio data via a wireless communication standard.

Aspect 13—A method for audio communication, the method comprising: receiving audio data for the voice communication, the audio data including voice data of the user and background audio data; classifying the background audio data into a plurality of types of background audio data; determining to not suppress a subset of the plurality of types of background audio data; processing the audio data to not suppress the subset of the plurality of types of background audio data to generate output audio data; and transmitting the output audio data.

Aspect 14—The method of Aspect 13, wherein determining to not suppress the subset of the plurality of types of background audio data comprises: receiving an input from the user indicating the subset of the plurality of types of background audio data.

Aspect 15—The method of Aspect 14, further comprising: generating a graphical user interface on a display, wherein the graphical user interface provides a plurality of selections corresponding to the plurality of types of background audio data; receiving one or more indications, via the graphical user interface, which identifies the subset of the plurality of background audio data to not suppress; and determining to not suppress a subset of the plurality of types of background audio data based on the one more indications.

Aspect 16—The method of Aspect 15, wherein generating the graphical user interface comprises: adaptively detecting the plurality of types of background audio data; and adaptively updating the plurality of selections based on the plurality of types of background audio data based detected.

Aspect 17—The method of any of Aspects 13-16, wherein the subset of the plurality of types of background audio data include background audio data related to security.

Aspect 18—The method any of Aspects 13-17, wherein classifying the background audio data into the plurality of types of background audio data comprises: processing the audio data using an artificial intelligence process to identify the plurality of types of background audio data.

Aspect 19—The method of Aspect 18, wherein the artificial intelligence process is one or more of a neural network, an artificial neural network, a deep neural network, a predictive analytics system, supervised learning, unsupervised learning, semi-supervised learning, or transfer learning.

Aspect 20—The method of any of Aspects 13-19, wherein processing the audio data to not suppress the subset of the plurality of types of background audio data to generate output audio data comprises: performing, on a first stream of the audio data, a noise suppression process to suppress the background audio data to generate voice only audio data; extracting, on a second stream of the audio data, the subset of the plurality of types of background audio data; and combining the voice only audio data with the subset of the plurality of types of background audio data to generate the output audio data.

Aspect 21—The method of any of Aspects 13-19, wherein processing the audio data to not suppress the subset of the plurality of types of background audio data to generate output audio data comprises: performing a noise suppression process on the audio data to suppress types of background audio data not in the subset of the plurality of types of background audio data to generate the output audio data.

Aspect 22—The method of any of Aspects 13-21, wherein the plurality of types of background audio data may include one or more of environmental noise, human-generated noise, animal-generated noise, mechanical noise, or electronic noise.

Aspect 23—The method of any of Aspects 13-22, wherein the method is performed by a mobile communications device.

Aspect 24—The method of any of Aspects 13-23, wherein transmitting the output audio data comprises: transmitting the output audio data via a wireless communication standard.

Aspect 27—A non-transitory computer-readable storage medium storing instructions that, when executed, cause one or more processors to: receive audio data for the voice communication, the audio data including voice data of the user and background audio data; classify the background audio data into a plurality of types of background audio data; determine to not suppress a subset of the plurality of types of background audio data; process the audio data to not suppress the subset of the plurality of types of background audio data to generate output audio data; and transmit the output audio data.

Aspect 28—The non-transitory computer-readable storage medium of Aspect 17, wherein to determine to not suppress the subset of the plurality of types of background audio data, the instructions further cause the one or more processors to: receive an input from the user indicating the subset of the plurality of types of background audio data.

Aspect 29—An apparatus configured to audio communication, the apparatus comprising: means for receiving audio data for the voice communication, the audio data including voice data of the user and background audio data; means for classifying the background audio data into a plurality of types of background audio data; means for determining to not suppress a subset of the plurality of types of background audio data; means for processing the audio data to not suppress the subset of the plurality of types of background audio data to generate output audio data; and means for transmitting the output audio data.

Aspect 30—The apparatus of Aspect 29, wherein the means for determining to not suppress the subset of the plurality of types of background audio data comprises: means for receiving an input from the user indicating the subset of the plurality of types of background audio data.

In one or more examples, the functions and techniques described herein may be implemented in hardware, software, firmware, or any combination thereof. If implemented in software, the functions and techniques may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software units or modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured for audio communication, the apparatus comprising:
   a memory configured to receive audio data from a user of a voice communication; and
   one or more processors in communication with the memory, the one or more processors configured to:
      receive the audio data for the voice communication, the audio data including voice data of the user and background audio data;
      classify the background audio data into a plurality of types of background audio data;
      determine to suppress a subset of the plurality of types of background audio data based on a noise suppression configuration, wherein the noise suppression configuration includes the indication of a noise suppression aggressiveness;
      process the audio data to suppress-the subset of the plurality of types of background audio data to generate output audio data based on the noise suppression aggressiveness; and
      transmit the output audio data.

2. The apparatus of claim 1, wherein to determine to suppress the subset of the plurality of types of background audio data, the one or more processors are configured to:
   receive an input from the user that specifies the noise suppression configuration that indicates the subset of the plurality of types of background audio data.

3. The apparatus of claim 2, further comprising a display, wherein the one or more processors are configured to:
   generate a graphical user interface on the display, wherein the graphical user interface provides a plurality of selections corresponding to the plurality of types of background audio data;
   receive one or more second indications, via the graphical user interface, which identifies the subset of the plurality of background audio data to suppress; and
   determine to suppress a subset of the plurality of types of background audio data based on the one more second indications.

4. The apparatus of claim 3, wherein to generate the graphical user interface, the one or more processors are configured to:
   adaptively detect the plurality of types of background audio data; and
   adaptively update the plurality of selections based on the plurality of types of background audio data based detected.

5. The apparatus of claim 1, wherein the subset of the plurality of types of background audio data include background audio data related to security.

6. The apparatus of claim 1, wherein to classify the background audio data into the plurality of types of background audio data, the one or more processors are configured to:
   process the audio data using an artificial intelligence process to identify the plurality of types of background audio data.

7. The apparatus of claim 6, wherein the artificial intelligence process is one or more of a neural network, an artificial neural network, a deep neural network, a predictive analytics system, supervised learning, unsupervised learning, semi-supervised learning, or transfer learning.

8. The apparatus of claim 1, wherein to process the audio data to suppress, based on the indication of noise aggressiveness, the subset of the plurality of types of background audio data to generate output audio data, the one or more processors are configured to:
perform, on a first stream of the audio data, a noise suppression process to suppress the background audio data to generate voice only audio data;
extract, on a second stream of the audio data, the subset of the plurality of types of background audio data; and
combine the voice only audio data with the subset of the plurality of types of background audio data to generate the output audio data.

9. The apparatus of claim 1, wherein to process the audio data to suppress the subset of the plurality of types of background audio data to generate output audio data, the one or more processors are configured to:
perform a noise suppression process on the audio data to suppress types of background audio data not in the subset of the plurality of types of background audio data to generate the output audio data.

10. The apparatus of claim 1, wherein the plurality of types of background audio data may include one or more of environmental noise, human-generated noise, animal-generated noise, mechanical noise, or electronic noise.

11. The apparatus of claim 1, wherein the apparatus is a mobile communications device.

12. The apparatus of claim 1, wherein to transmit the output audio data, the one or more processors are configured to:
transmit the output audio data via a wireless communication standard.

13. The apparatus of claim 1, wherein the indication of the noise suppression aggressiveness indicates that a user set a specific level of noise suppression for the subset of the plurality of types of background audio data.

14. The apparatus of claim 1, wherein a user need not reselect what types of background noise, in the subset of the plurality of types of background audio data, are passed through for every voice communication.

15. The apparatus of claim 1, wherein the noise suppression configuration is reset and updated for each voice communication.

16. A method for audio communication, the method comprising:
receiving audio data for the voice communication, the audio data including voice data of the user and background audio data;
classifying the background audio data into a plurality of types of background audio data;
determining to suppress a subset of the plurality of types of background audio data based on a noise suppression configuration, wherein the noise suppression configuration includes an indication of a noise suppression aggressiveness;
processing the audio data to suppress the subset of the plurality of types of background audio data to generate output audio data based on a noise suppression configuration, wherein the noise suppression configuration includes the indication of a noise suppression aggressiveness; and transmitting the output audio data.

17. The method of claim 16, wherein determining to not suppress the subset of the plurality of types of background audio data comprises:
receiving an input from the user that specifies the noise suppression configuration indicating the subset of the plurality of types of background audio data.

18. The method of claim 17, further comprising:
generating a graphical user interface on a display, wherein the graphical user interface provides a plurality of selections corresponding to the plurality of types of background audio data;
receiving one or more second indications, via the graphical user interface, which identifies the subset of the plurality of background audio data to suppress; and
determining to suppress a subset of the plurality of types of background audio data based on the one more second indications.

19. The method of claim 18, wherein generating the graphical user interface comprises:
adaptively detecting the plurality of types of background audio data; and
adaptively updating the plurality of selections based on the plurality of types of background audio data based detected.

20. The method of claim 16, wherein the subset of the plurality of types of background audio data include background audio data related to security.

21. The method of claim 16, wherein classifying the background audio data into the plurality of types of background audio data comprises:
processing the audio data using an artificial intelligence process to identify the plurality of types of background audio data.

22. The method of claim 21, wherein the artificial intelligence process is one or more of a neural network, an artificial neural network, a deep neural network, a predictive analytics system, supervised learning, unsupervised learning, semi-supervised learning, or transfer learning.

23. The method of claim 16, wherein processing the audio data to not suppress, based on the indication of noise aggressiveness, the subset of the plurality of types of background audio data to generate output audio data comprises:
performing, on a first stream of the audio data, a noise suppression process to suppress the background audio data to generate voice only audio data;
extracting, on a second stream of the audio data, the subset of the plurality of types of background audio data; and
combining the voice only audio data with the subset of the plurality of types of background audio data to generate the output audio data.

24. The method of claim 16, wherein the plurality of types of background audio data may include one or more of environmental noise, human-generated noise, animal-generated noise, mechanical noise, or electronic noise.

25. The method of claim 16, wherein the method is performed by a mobile communications device.

26. The method of claim 16, wherein transmitting the output audio data comprises:
transmitting the output audio data via a wireless communication standard.

27. A non-transitory computer-readable storage medium storing instructions that, when executed, cause one or more processors to:
receive audio data for the voice communication, the audio data including voice data of the user and background audio data;
classify the background audio data into a plurality of types of background audio data;

determine to suppress a subset of the plurality of types of background audio data based on a noise suppression configuration, wherein the noise suppression configuration includes the indication of a noise suppression aggressiveness;
   process the audio data to suppress-the subset of the plurality of types of background audio data to generate output audio data based on the noise suppression aggressiveness; and
transmit the output audio data.

28. An apparatus configured to audio communication, the apparatus comprising:
   means for receiving audio data for the voice communication, the audio data including voice data of the user and background audio data;
   means for classifying the background audio data into a plurality of types of background audio data;
   means for determining to suppress a subset of the plurality of types of background audio data based on a noise suppression configuration, wherein the noise suppression configuration includes an indication of a noise suppression aggressiveness;
   means for processing the audio data to suppress the subset of the plurality of types of background audio data to generate output audio data based on a noise suppression configuration, wherein the noise suppression configuration includes the indication of a noise suppression aggressiveness; and
   means for transmitting the output audio data;
transmitting the output audio data.

* * * * *